US009467328B2

(12) United States Patent
Ayanam et al.

(10) Patent No.: US 9,467,328 B2
(45) Date of Patent: Oct. 11, 2016

(54) REMOTE MANAGEMENT OF DIGITAL SIGNAGE DEVICES

(71) Applicant: AMERICAN MEGATRENDS, INC., Norcross, GA (US)

(72) Inventors: Varadachari Sudan Ayanam, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 428 days.

(21) Appl. No.: 13/894,115

(22) Filed: May 14, 2013

(65) Prior Publication Data
US 2014/0344430 A1  Nov. 20, 2014

(51) Int. Cl.
*H04L 12/24* (2006.01)

(52) U.S. Cl.
CPC ....... *H04L 41/0226* (2013.01); *H04L 41/0213* (2013.01); *H04L 41/0266* (2013.01); *H04L 41/22* (2013.01)

(58) Field of Classification Search
CPC .... H04L 12/24; G06Q 30/0241; G09F 19/22
USPC ......................................................... 709/220
IPC ....................................................... H04L 67/02
See application file for complete search history.

(56) References Cited

U.S. PATENT DOCUMENTS

| 8,069,257 | B1 * | 11/2011 | Bhatia | G06F 13/105 345/501 |
|---|---|---|---|---|
| 2004/0249913 | A1 * | 12/2004 | Kaufman, Jr. | G06F 11/3006 709/223 |
| 2007/0192468 | A1 * | 8/2007 | Keeler | G06Q 30/0241 709/223 |
| 2009/0276491 | A1 * | 11/2009 | Lin | H04L 67/025 709/204 |
| 2012/0265862 | A1 * | 10/2012 | Fang | H04L 41/0233 709/220 |
| 2014/0032641 | A1 * | 1/2014 | Du | H04L 43/065 709/203 |
| 2014/0149592 | A1 * | 5/2014 | Krishna | G06F 1/329 709/226 |
| 2014/0173093 | A1 * | 6/2014 | Rabeela | H04L 61/2038 709/224 |
| 2015/0116811 | A1 * | 4/2015 | Shrivastava | G08C 17/02 359/275 |

OTHER PUBLICATIONS

POPAI, "POPAI Digital Signage Device RS-232 Control Standard," Jan. 1, 2006, "http://www.popai.com/industry-resources/popai-digital-signage-device-rs-232-control-standard".*

* cited by examiner

*Primary Examiner* — Kevin Bates
*Assistant Examiner* — Chen-Liang Huang
(74) *Attorney, Agent, or Firm* — Locke Lord LLP; Tim Tingkang Xia, Esq.

(57) ABSTRACT

Certain aspects of the present disclosure are related to a signage device controller. In certain embodiments, the signage device controller has: (a) a processor, (b) a network interface controller, (c) a communication control point in accordance with a control protocol and (d) a memory containing firmware. The firmware is configured to, when executed at the processor, (a) be in communication with managed signage device through the communication control point, (b) receive, through the network interface controller, a management request in a communication protocol from a remote management system through an out-of-band network for instructing the firmware to perform a management operation at the managed signage device, and (c) construct a control command in accordance with the control protocol and send the control command to the managed signage device through the communication control point to instruct the managed signage device to perform the management operation.

25 Claims, 6 Drawing Sheets

| STX | ADDRESS | | TYPE | PROPERTY ID | | LENGTH | DATA | ETX |
|---|---|---|---|---|---|---|---|---|
| 02 | 00 | 00 | 01 | 00 | 01 | 01 | 01 | 03 |

FIG. 5A

| STX | ADDRESS | | TYPE | PROPERTY ID | | LENGTH | DATA | | ETX |
|---|---|---|---|---|---|---|---|---|---|
| 02 | 00 | 00 | 01 | FE | 00 | 02 | 00 | 01 | 03 |

FIG. 5B

| STX | ADDRESS | | TYPE | PROPERTY ID | | LENGTH | DATA | ETX |
|---|---|---|---|---|---|---|---|---|
| 02 | 00 | 02 | 01 | 00 | 02 | 01 | 23 | 03 |

FIG. 5C

| STX | ADDRESS | | TYPE | PROPERTY ID | | LENGTH | DATA | | ETX |
|---|---|---|---|---|---|---|---|---|---|
| 02 | 00 | 02 | 01 | FE | 00 | 02 | 00 | 02 | 03 |

FIG. 5D

REMOTE MANAGEMENT OF DIGITAL SIGNAGE DEVICES

FIELD

The present disclosure generally relates to signage devices, and more particularly to remote management of signage devices through a service processor or management controller.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

With modern technology especially in the large LED/LCD display area, digital signage devices are currently widely used. Typically, the signage devices are controlled locally through Digital Signage Device RS-232 Control Standard (POPAI) or other proprietary standards, which lacks of sophisticated out-of-band control functionalities.

Therefore, heretofore unaddressed needs still exist in the art to address the aforementioned deficiencies and inadequacies.

SUMMARY

Certain aspects of the present disclosure are related to a signage device controller. In certain embodiments, the signage device controller has: (a) a processor, (b) a network interface controller, (c) a communication control point in accordance with a control protocol and (d) a memory containing firmware. The firmware is configured to, when executed at the processor, (a) be in communication with managed signage device through the communication control point, (b) receive, through the network interface controller, a management request in a communication protocol from a remote management system through an out-of-band network for instructing the firmware to perform a management operation at the managed signage device, and (c) construct a control command in accordance with the control protocol and send the control command to the managed signage device through the communication control point to instruct the managed signage device to perform the management operation. In certain embodiments, the firmware is further configured to (a) receive response from the managed signage device, (b) construct an IPMI response message carrying the response from the managed signage device, and (c) send the IPMI response message back to the remote management system.

In certain embodiments, the remote management system is a remote management device, or a mobile remote management device. The remote management device and the mobile remote management device has a web browser, an operating system, and an application program having at least a user interface module, and a client management module in accordance with the first communication protocol. The signage device controller is an out-of-band service processor that provides an out-of-band communication access for the remote management system to communicate with the managed signage device, and signage display contents are transmitted to the at least one managed signage device over an in-band communication network.

In certain embodiments, the firmware also has: (a) a signage display management module configured to manage and perform control functions on the managed signage device according to a second communication protocol, (b) an IPMI message module configured to process the incoming IPMI message from and outgoing IPMI message to a remote management device, (c) a RS-232 communication control point for receiving and transmitting RS-232 protocol communication through a RS-232 communication link, (d) a system event log (SEL) for storing signage display events and system events of the remote management system of signage display, (e) a sensor data record (SDR) repository configured to store inventory of the managed signage device connected through the RS-232 communication link, and (f) a network interface module configured to receive IPMI messages from the remote management device and to transmit IPMI response messages to the remote management computer.

In certain embodiments, each of the management requests received by the signage display management module includes management commands in accordance with the communication protocol. The signage display management module constructs a control protocol command based on the management requests, and the control protocol is capable of directing communication among the at least one managed signage device. In one embodiment, the communication protocol is IPMI protocol. The IPMI message module is configured to extract an OEM command from an IPMI message received through the network interface controller. The signage display management module is configured to translate the OEM command to a corresponding RS-232 control command. Each of the management requests is an IPMI message, the IPMI message including at least an IPMI standard command or an IPMI OEM command, a signage device ID of a selected managed signage device, and an related command value. In another embodiment, the communication protocol is HTTP protocol and the management request is an HTTP request. The HTTP request includes at least an control command, a signage device ID of a selected managed signage device, and a related command value.

In certain embodiments, an RS-232 communication control point is in communication with the at least one managed signage device in accordance with RS-232 communication protocol, and the signage display management module is configured to (a) retrieve, from the IPMI message, an IPMI OEM command having a control function, and the signage device ID of the managed signage device the control function is directed to, (b) translate the IPMI OEM command into a corresponding RS-232 command, and (c) transfer the RS-232 command to the managed signage device designated by the signage device ID. The managed signage device performs the control function according to the RS-232 command received.

In certain embodiments, the firmware is configured to determine a managed signage device from the at least one managed signage device based on inventory information stored in a SDR repository. The inventory information is obtained during the initial installation of managed signage devices. The firmware is configured to (a) associate addresses of the at least one managed signage device and in accordance with the RS-232 communication protocol with respective signage device IDs, (b) maintain a record of the association of the signage device IDs and addresses, and (c) determine an address of a target signage device by examining the record with a device ID of the target signage device. In certain embodiments, the control protocol is in accordance with Digital Signage Device RS-232 control standard.

Certain aspects of the present disclosure are directed to a signage device controller implemented method for managing at least one signage device. The method includes: (a) receiving, at the signage device controller, a management request from a remote management system in accordance with a communication protocol at a network interface controller, the management request has at least a management command and an device ID of the at least one managed signage device, (b) extracting the management command and the device ID of the at least one managed signage device, (c) translating the management command to a control command in accordance with a control protocol, (d) sending the control command to the at least one managed signage device designated by the device ID, (e) receiving response from the at least one managed signage device, (f) constructing an IPMI response message carrying the response from the at least one managed signage device, and (g) sending the IPMI response message back to the remote management system. In one embodiment, the communication protocol is IPMI protocol. The management request is an IPMI message. The IPMI message includes at least an IPMI standard command or an IPMI OEM command, a signage device ID of a selected managed signage device, and a related command value. In another embodiment, the communication protocol is HTTP protocol. The management request is an HTTP request. The HTTP request includes at least a control command, a signage device ID of a selected managed signage device, and a related command value. In certain embodiments, the control protocol is in accordance with Digital Signage Device RS-232 control standard.

In certain embodiments, the remote management system is a remote management device. The remote management device has a web browser, and the signage device controller has a web server that delivers a management webpage to the web browser. The management webpage is configured to instruct the web browser to send the management request to the web server. The signage device controller is an out-of-band service processor that provides an out-of-band communication access for the remote management system to communicate with the at least one managed signage device. The signage display contents are transmitted to the at least one managed signage device over an in-band communication network.

Certain aspects of the present disclosure are directed to a non-transitory computer storage medium. The non-transitory computer storage medium stores computer executable instructions. When the computer executable instructions are executed by a processor of a signage device controller, the computer executable instructions cause the processor to: (a) receive a management request from a remote management system in accordance with a communication protocol through a network interface controller, and the management request has at least a management command and a device ID of at least one managed signage device, (b) extract the management command and the device ID of the at least one managed signage device from the management request, (c) translate the management command into a control command in accordance with a control protocol, (d) send the control command to the at least one managed signage device designated by the device ID, (e) receive response from the at least one managed signage device, (f) construct an IPMI response message carrying the response from the at least one managed signage device, and (g) send the IPMI response message back to the remote management system.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIGS. 5A-5D illustrate exemplary RS-232 commands constructed by a signage device controller 122 according to embodiments of the present disclosure.

DETAILED DESCRIPTION

Figure 1:
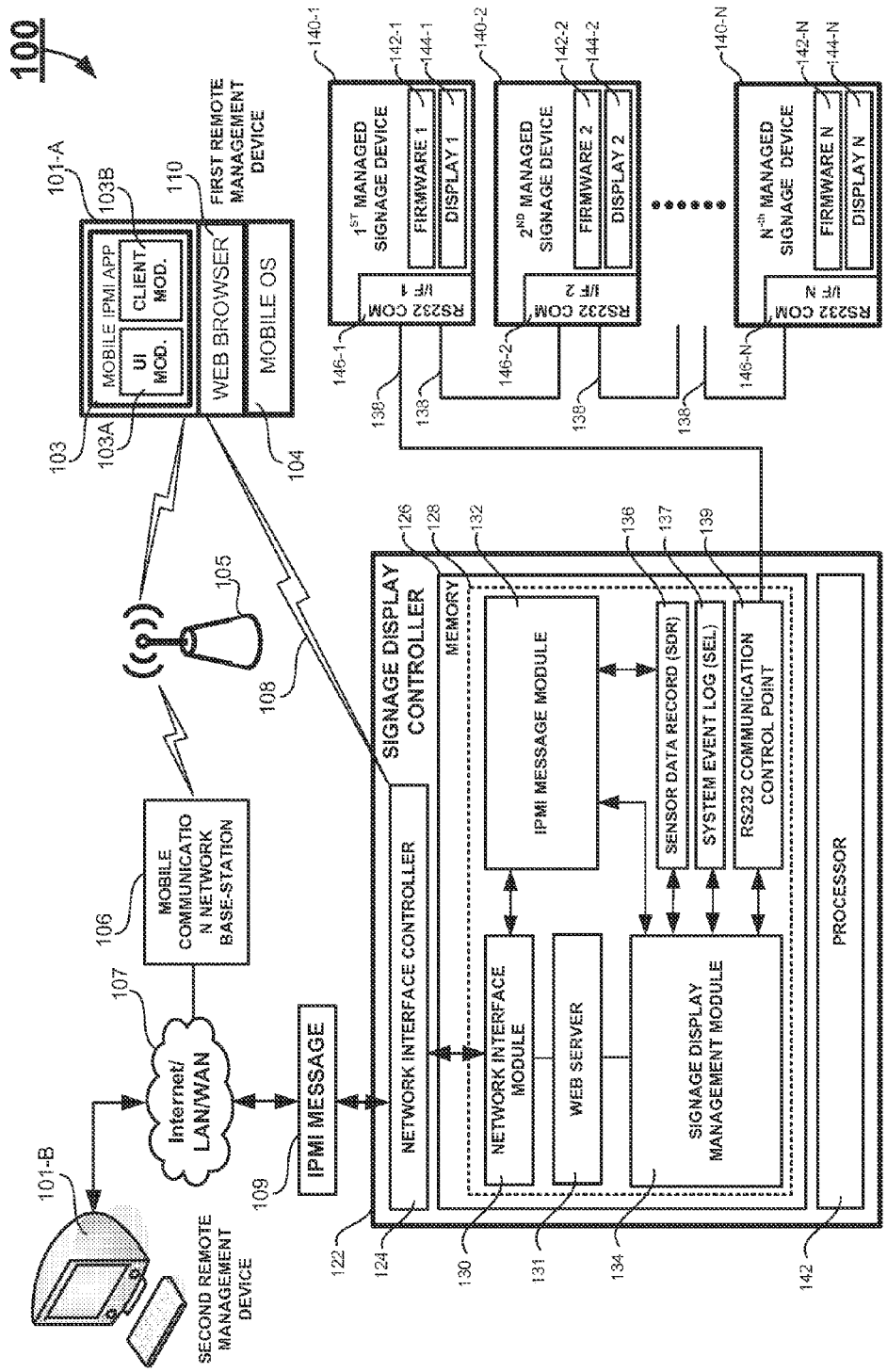
FIG. 1 schematically shows a remote management system of managed signage devices according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions, will control.

As used herein, "around", "about" or "approximately" shall generally mean within 20 percent, preferably within 10 percent, and more preferably within five percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

Current advance in large size LED, LCD, light matrix made it possible to provide managed signage devices to provide very large size signage, billboard, and display device various display in texts, still messages, animations, videos, and real time information. Digital signage devices can be managed or controlled through the RS-232 control standard or other proprietary standards.

Referring to FIG. 1, a conceptual illustration of a remote digital signage display management system 100 is shown according to one embodiment of the present disclosure. The remote digital signage display management system 100 includes a signage device controller 122, a number of managed signage devices 140-I, I=1, 2, . . . , N, a communication network, and a remote management system 101. Each of the plurality of managed signage devices 140-I has a firmware 142-I, a display 144-I, and a RS-232 communication interface or other proprietary communication interface 146-I, where I=1, 2, . . . , N. From now on, the RS-232 communication interface refers to either the RS-232 communication interface or the other proprietary communication interfaces, unless otherwise noted. Further, the RS-232 control command system recommended by POPAI Digital Signage Standards committee covers a wide-range of usage possibilities. The Digital Signage Device RS-232 Control Standard Request for Comments—Revision 1.0, Jun. 15, 2006, provided by POPAI Digital Signage Standards Committee, is incorporated herein by reference.

In certain embodiments, the communication network can include: a mobile communication network 105 with a mobile communication network base-station 106, an Internet/LAN/WAN network 107, and personal area network (PAN) 108. The mobile communication network 105 can include one or more of GSM, GPRS, HSPA, CDMA, WCDMA, WiMAX, LTE, and other networks. The personal area network 108 can one or more of Wi-Fi, Zigbee, and Bluetooth networks.

In certain embodiments, the remote management system includes a first remote management device 101-A, and a second remote management device 101-B. As illustrated in FIG. 1, the first remote management device 101-A is an internet connected mobile device such as a smart phone, or a tablet computer. The second remote management device 101-B is a laptop or desktop computer.

In one embodiment, the first remote management device 101-A may be a mobile communication device such as a smart phone or a tablet computer with network connectivity. These smart phone and tablet computer can include a mobile operating system 104, as well as one or more application programs. An application program is software that runs on top of the operating system software and uses computer resources made available through the operating system to perform application specific tasks desired by the user. The mobile operating system may be any of the following: such as iOS, WINDOWS, OR ANDROID operating system, etc. In certain embodiments, the first remote management device 101-A has an IPMI Application program 103, which has a user interface module 103-A and an IPMI client management module 103-B.

In certain embodiments, the second remote management device 101-B may be a regular computer or a special purpose computer also with network connectivity. In certain embodiments, the second remote management device 101-B includes one or more operating systems as well as one or more application programs. The operating system has a set of programs that control operations of the second remote management device 101-B. The set of application programs, inclusive of certain utility programs, may also provide a graphical user interface to the operator. The operating system is operable to multitask, i.e., execute computing tasks in multiple threads, and thus may be any of the following: MICROSOFT CORPORATION's "WINDOWS XP" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, the second remote management device 101-B has an IPMI Application program 103 (not shown in FIG. 1), which has a user interface module 103-A (not shown in FIG. 1) and an IPMI client management module 103-B (not shown in FIG. 1).

The remote management devices 101 each can also include a web browser 110 and an IPMI management application 103. The IPMI management application 103 is configured to remotely manage the managed signage devices using IPMI standard. The web browser can be one of: SAFARI, CHROME, FIREFOX, and INTERNET EXPLORER.

In certain embodiments, the first remote management device 101-A, and the second remote management device 101-B both have a user interface module 103-A to allow the operator to (a) login to the signage device controller (SDC) 122, (b) display various user interfaces to the operators, (c) display information of the managed signage devices, (d) receive an operator's input from the user interface module for managing and controlling the managed signage devices.

In certain embodiments, the user interface module can generate various user interfaces (UIs) and display the UIs on a display screen of the first remote management device 101-A, and the second remote management device 101-B, respectively. The user interface module allows the operator to enter various user inputs for operating the signage device controller 122.

In certain embodiments, the user interface module can generate and display a login screen. The login screen for example has a username field, a password field, and field for entering a network address of the signage device controller 122. The user interface module receives username and password entered by the operator. Upon the operator presses an "enter" or "login" button on the login screen, the user interface module construct a user-authentication input and calls an input-executing function of an IPMI client management module of the IPMI management application to pass the input to the IPMI client management module. The input-executing function of the IPMI client management module processes the user-authentication input and in response returns an execution result to the user interface module. In response to a user-authentication input, the result can be an "access granted" message when the user is authorized by the signage device controller 122, or an "access denied" message when user is not authorized. Accordingly, the user interface module can display those messages on the display screen of the remote management devices.

In certain embodiments, after the operator login to the signage device controller 122, the operator may want the user interface module to list all digital signage devices connected to the signage device controller 122. The user interface module can display a signage-display-device option on the screen of the remote management devices. When the operator selects the signage-display-device option, the user interface module construct a signage-display-device input and calls again the input-execution function of the IPMI client management module to pass the user input. In response to the signage-display-device input, the input-execution function of the IPMI client management module returns a list of managed signage devices. The list of managed signage devices may be empty if there is no signage device connected to the signage device controller 122. The user interface module can generate a display-device interface showing the managed signage devices. Each device is associated with a device identifier (device ID).

In certain embodiments, once the operator obtains the list of signage devices, the operator may want set up signage display settings of the remote management devices. The settings of the remote management devices include: (a) setting up signage display input source, (b) setting up one or more signage devices; and (c) making audio- and video-playback adjustments to the signage devices. The audio adjustment includes setting the audio level higher or lower, setting the audio mute on or off, etc. The display adjustment includes setting the brightness, contrast, color, or setting the close caption on or off etc. The user interface module sends an adjustment input to the IPMI client management module to request the selected one or more of the managed signage devices to make appropriate adjustments. As will be discussed in detail below, the IPMI client management module sends a request message to the SDC 122 and receives a response message back. Based on the received response message, the IPMI client management module sends to the user interface module a response indicating that the rendering request is executed or an error message showing why the audio or display adjustment has failed. On the display screen of the user interface module, the response may be displayed.

In certain embodiments, the user interface module is able to present the operator various display options. When the user interface module receives instructions received from the signage display management module 134, which are generated in accordance with the response messages from the signage device controller 122, it can display, for example, the list of signage devices connected to the signage device controller 122, the current status of the managed signage devices, and the various signage device adjustment responses and status.

The IPMI client management module 103-B of the remote management devices communicate with the signage device controller 122 in both directions through one or more IPMI messages. The IPMI client management module of the remote management devices sends two types of commands to the signage device controller 122: (a) a standard IPMI commands, such as standard IPMI commands to retrieve an entry from the SDR, or delete an entry from the SDR, and (b) an IPMI OEM commands. IPMI OEM commands are the non-standard IPMI commands that are utilized by the remote management devices to implement the control and control functions of the remote signage display management system 100.

In general, the IPMI client management module can send IPMI message 109 having predetermined standard IPMI commands and IPMI OEM commands to the signage device controller 122. The IPMI standard commands correspond to various standard IPMI operations and the IPMI OEM commands corresponds to various non-standard IPMI operations specifically designed to remote management of the managed signage devices. These IPMI standard commands and IPMI OEM commands are executed at the signage device controller 122. The IPMI OEM message 109 can also include parameters of the remote signage-display-device control functions. In order to perform each remote signage-display-device control function, the signage device controller 122 invokes one or more control functions of the managed signage device based on the IPMI OEM commands and the parameters accordingly.

The IPMI messages typically include the following fields.

Network Function (NetFn): A field that identifies the functional class of the message. The values for the network function fields include: requests and responses of for many standard IPMI functions and certain reserved and OEM/Non-IPMI functions. Here, the OEM/Non-IPMI functions are used for the remote signage device management over the managed signage devices.

Request/Response identifier: A field that unambiguously differentiates Request Messages from Response Messages. This identifier is reflected in the Network Function code such that 'Even' network function codes identify Request Messages, and 'Odd' network function codes identify Response Messages. For example, IPMI OEM request is represented by 2Fh and IPMI OEM response is represented by 2Eh.

Requester's ID: Information that identifies the source of the Request, e.g. the remote management device 101. This information must be sufficient to allow the Response to be returned to the correct Requester.

Responder's ID: A field that identifies the Responder to the Request. In Request Messages, this field is used to address the Request to the desired Responder, in Response Messages this field is used to assist the Requester in matching up a response with a given request.

Command: The messages specified in this document contain a one-byte command field. Commands are unique within a given Network Function. Command values can range from 00h through FDh. Code FEh is reserved for future extension of the specification, and code FFh is reserved for message interface level error reporting on potential future interfaces.

Data The Data field carries the additional parameters for a request or a response, if any. The data field is embedded in an IPMI message and sent over a network, and extracted at an IPMI message module of the signage device controller 122.

As will be described below, in certain embodiments, the SDC 122 assigns a device ID to each signage device 140 in a daisy chain that can be managed by the SDC. Further, some of the typical and exemplary signage control functions supported by the SDC 122 are listed below.

| Signage control functions | IPMI CMD NetFN | OEM Command |
|---|---|---|
| Power | 2Fh | 01h |
| Input Source | 2Fh | 02h |
| Screen Sizing | 2Fh | 03h |
| Brightness | 2Fh | 04h |
| Contrast | 2Fh | 05h |
| Tint | 2Fh | 06h |
| Sharpness | 2Fh | 07h |
| Volume | 2Fh | 08h |
| Volume Mute | 2Fh | 09h |

In certain embodiments, the data field of the IPMI message includes OEM commands listed above, as well as other information such as device ID and respective parameter values. For example, the device ID can be from 00h through FFh. The 00h represents global address for all signage devices connected to the RS-232 communication link 138. If the device ID field is a non-zero number (e.g., 1Eh), typically the device ID is directed to a particular signage device. A parameter can also have a value from 00h through FFh.

In certain embodiments, the IPMI client management module receives inputs from the user interface, distinguishes a management request or parameters of a specific operation. First the IPMI client management module determines whether it should construct an IPMI standard message or IPMI OEM message to execute the user requested signage control functions. For example, if a user is requesting some brief information regarding a signage display stored in the SDR repository 136 of the signage device controller 122, the IPMI client management module can construct an IPMI message including a standard IPMI getSDR command, and send that IPMI message. If a user is requesting increase the brightness of a signage device (e.g., device ID=02), the IPMI client management module can construct an IPMI message including an OEM command (e.g., 04h) as illustrated above as well as a parameter indicating the desired brightness value. In this case, the IPMI data field the device ID field=00 02, and the parameter field may be 64 (which is the maximum brightness). The IPMI message 109 includes network function code for the respective standard IPMI command or IPMI OEM command based on the user input. The IPMI message 109 is sent to the signage device controller 122. Once the signage device controller 122 executes the IPMI operation (Standard or OEM), the signage device controller 122 sends back an IPMI response message. The IPMI client management module will then receive the IPMI response message and accordingly instruct the user interface module to display corresponding user interface and information.

The IPMI OEM commands may be configured to correspond to control functions defined by the POPAI standard or control functions defined by other control standard. The IPMI OEM commands are received at the signage display management module 134, which then translates the OEM commands received into POPAI commands or other control standard commands. Then the signage display management module 134 constructs a POPAI commands or other control standard commands along with their parameter values and send the commands to the managed signage devices designated by the device ID.

If the IPMI message sent out involves information request, the IPMI client management module will then receive an IPMI response message back from the signage device controller 122 and the response contains the information requested. When information request involves multiple parameters and multiple results, the IPMI client management module will be able to identify the parameters and organize the responses individually such as in a table form so that the user interface module is able to display the results in a user friendly format.

When the operator wants to turn off the audio of a managed signage device, the operator selected an audio adjustment option displayed on a UI screen to adjust audio setting of the selected signage device. The user interface module receives this input and sends an input to the IPMI client management module to turn of the audio of the signage device. Once the IPMI client management module receives an input from the user interface module, it determines that this operation will not be completed by using standard IPMI operation, and therefore this is a non-standard IPMI operation. The IPMI OEM command corresponding to that control operation is sent over to the signage device controller 122 in an IPMI OEM message. The signage device controller 122 will execute the operation and return a status response to the IPMI client management module. The IPMI client management module forwards status response to the user interface module and the user interface module can display the status response on the user interface screen.

In certain embodiments, the remote management device can utilize a web browser to communicate with a Web server of the signage device controller 122. The web browser can display management webpages delivered by the Web server. The management webpages present different control functions, similar to those discussed above, to a user. The user may select a control function through the management webpages. For example, the user may input instructions of increasing the brightness of a particular signage device to 100%. The web browser, accordingly, can send those user instructions through standard HTTP requests to the Web server at the signage device controller 122. The instructions can include control functions to be performed at one or more signage devices and parameters associated with that control function.

In certain embodiments, the signage device controller 122 includes at least a processor 142, a network interface controller 124, and a memory 126. The memory 126 includes at least a firmware 128. The firmware 128 can have a network interface module 130 for, among other things, receiving an IPMI message 109 from the remote management system 101, a digital signage management module 134 for performing all control function of the signage device controller 122 on the managed signage devices 140-I, I=1, 2, . . . , N, and a RS-232 communication control point (or other proprietary communication protocol control points) 140 for facilitating the communications between the signage device controller 122 and the managed signage devices 140-I, I=1, 2, . . . , N. In certain embodiments, the firmware can include an IPMI message module 132 for processing IPMI message received from the remote management system 10, a sensor data record (SDR) 136, and a system event log (SEL) 137. The communications between the signage device controller 122 and the managed signage devices 140-I, I=1, 2, . . . , N typically are through a wired connection, but in certain circumstances can be through a wireless connection.

In one embodiment, the communications between the signage device controller 122 and the remote management system 101 are in accordance with the IPMI standard, and the communications between the signage device controller 122 and the plurality of managed signage devices 140-I, I=1, 2, . . . , N are in accordance POPAI's Digital Signage Device RS 232 Control Standard or some other proprietary communication protocols. In the example shown in FIG. 1, the plurality of managed signage devices are coupled in serial and in a RS-232 daisy-chain form and are controlled by the signage device controller 122 through the RS-232 Control Standard.

The signage device controller 122 may be a general purpose computer system, or a special purpose computing device. In certain embodiments, the signage device controller 122 122 is an out-of-band service processor and communicates with the remote management devices through an out-of-band network. The signage device controller 122 122 communicates with the remote management devices through out-of-band communication. On the other hand, a main controller of a signage display is in communication with a signage content provider through an in-band network. The signage content provider delivers the content to be played at the signage display through an in-band communication.

In certain embodiments, the signage device controller 122 includes an operating system or a kernel. In case of an operating system, it can be any one of the following: WINDOWS XP, WINDOWS Vista, WINDOWS 7, and WINDOWS 8, OS/2 WARP, MACINTOSH OS X, LINUX, UNIX, etc.

In certain embodiments, the IPMI message 109 is processed at the IPMI message module 132 of the signage device controller 122. The IPMI message module 132 performs a number of functions as described in following sections.

As a central processor of IPMI messages, the IPMI message module 132 receives IPMI messages from the IPMI client management module of the remote management system 101, processes the IPMI messages received, and sends response IPMI messages back to the IPMI client management module of the remote management system 101. When the IPMI message module 132 receives an IPMI message embedded in an IP packet, it first extracts the IPMI command from the IP packet, and determines the IPMI command received is a standard IPMI command or an IPMI OEM command based on a network function code in the network function field of the IPMI message.

When the operator needs some inventory information about the managed signage devices, this request can be fulfilled by direct access the sensor data record (SDR) 136 of the signage device controller 122. The SDR 136 stores inventory information such as device ID, device address, and other inventory information. The IPMI client management module of the remote management devices sends a standard IPMI command—getSDR( ) to the IPMI message module 132. The getSDR( ) command is then passed to IPMI Message Handler of the IPMI message module 132 and executed. The inventory information of the managed signage devices are packaged in one or more IPMI response messages and sent back to the IPMI client management module of the remote management devices.

For example, when the operator wants to get an inventory of all managed signage devices, the operator selects an option displayed on the user interface screen to retrieve inventory information of all managed signage devices. The user interface module of the remote management device receives this input and sends a message to the IPMI client management module to get all the device information from the signage device controller 122. As described above, the SDR is utilized to store inventory information such as device ID. Once the IPMI client management module receives message from the user interface module, it determines that this operation can be completed by access the SDR repository of the signage device controller 122 and that this is a standard IPMI operation. The IPMI client management module sends a standard IPMI command—getSDR( ) with a parameter Total_Device_Record to the signage device controller 122. The Total_Device_Record is the total number of managed signage devices stored in the SDR. The IPMI message module 132 then sent a get SDR command with a Record ID to the SDR 136 to retrieve the sensor data records information for the managed signage devices with Record ID, stored in the SDR 136. The Record ID is the identifier of SDR entries. In certain embodiments, the Record ID ranges from a first entry to a last entry. For example, if the Record ID is 0000h, the IPMI message module 132 will receive the SDR information of the first entry. If the Record ID is FFFFh, the IPMI message module 132 will receive the SDR information of the last entry. If the Record ID is a specific number between 0000h and FFFFh, the IPMI message module 132 will receive the SDR information of the Record ID-th entry. The signage device controller 122 executes retrieve SDR information function in Total_Device_Record times and returns to the IPMI client management module a list of managed signage devices stored in the SDR. The IPMI client management module forwards the list to the user interface module, and the user interface module can display the list of managed signage devices on the user interface screen of the remote management device.

If the operation is a non-standard IPMI operation such as making audio- or display adjustment to a managed signage device, then the IPMI message contains non-standard or OEM network function code and accompanying command code. The IPMI message module 132 will pass the OEM command to the signage display management module 134 of the signage device controller 122 and calls a function of the signage display management module 134 of the signage device controller 122 to perform the corresponding signage control functions. The signage display management module 134 of the signage device controller 122 may return a response to the IPMI message module 132. The IPMI message module 132 will then construct an IPMI response message, and embed the response message in the IPMI response message and send back to the IPMI client management module of the remote management devices.

In certain embodiments, the SDR 136 is configured to store inventory information of all managed signage devices. The SEL 137 is configured to keep the system event log including the signage devices management event and signage display events.

The RS-232 communication control point 139 is configured for establishing communications between the signage device controller 122 and the managed signage devices 140-I, I=1, 2, . . . , N.

In certain embodiments, the signage device controller 122 has a signage display management module 134. The signage display management module 134 can receive operation instruction from the IPMI message module 132 or the web server and accordingly manage the signage devices.

Typically each of the signage devices in the daisy chain is assigned a device address. The signage device controller 122 can store the device addresses and other device related information, which are associated with or identified by the respective device IDs, in a sensor data record (SDR) repository of the signage device controller 122. The SDR repository can be a non-volatile portion of the memory 128 of the signage device controller 122. In certain embodiments, the signage device controller 122 uses an OEM SDR format to store SDRs having signage devices related information in the SDR repository.

In certain embodiments, the signage display management module 134 receives an IPMI operation instruction from the IPMI message module 132. The instructions may include: setting up the managed signage devices, retrieving information of the managed signage devices, and managing signage displays. The IPMI OEM commands are interpreted by the signage display management module 134 along with associated parameters. For example, if the IPMI OEM commands request the signage device specified by the device ID to turn up the brightness, then the associated parameters include the brightness value the user wants the signage device to display. For example, if the user wants the signage device to display 50% brightness, the associated parameter value can be 32. If the user wants the signage device to display 100% brightness, the associated parameter value can be 64. The signage display management module 134 can construct a RS-232 command to the managed signage device to execute this OEM command. Other control commands include: making audio adjustment, making display adjustment, and switching signage display content sources, etc.

In certain embodiments, the signage display management module 134 is configured to, as instructed by the OEM commands or other user instructions, select an input source for the signage device. The signage content signals can be delivered to the signage device through multiple input sources such as various RGB video inputs, PC inputs, and HDMI inputs. The signage display management module 134 can instruct the signage device to select one of the available input sources and display media content delivered through that input source.

In certain embodiments, the signage display management module 134 is configured to store all events occurred to the signage device controller 122 in the system event log (SEL) 137. The signage display management module 134 keeps a log for all managed signage device management operation events, all signage display events, and any error messages returned from the managed signage devices.

In certain embodiments, the signage display management module 134 is configured to execute POPAI commands in accordance with instructions received from the web server 131. The Web server extracts the user instructions (e.g., increasing the brightness to 100%) from the HTTP requests sent from the web browser 110, and then sends those instructions to the signage display management module 134. The signage display management module 134, in turn, interprets those instructions and that constructs corresponding RS-232 Control Standard commands. Then, the signage display management module 134 sends those commands to the managed signage devices through the RS-232 communication control point 139.

In certain embodiments, the signage display management module 134 of the signage device controller 122 can accept IPMI standard commands through the IPMI message module 132 described earlier for performing control functions (managing the managed signage devices), extract the OEM commands embedded in the IPMI messages, translate the OEM commands to corresponding RS-232 standard control commands, and send these RS-232 standard control commands to the plurality of managed signage devices 140-I (I=1, 2, . . . , N) to instruct these managed signage devices to perform these RS-232 standard control functions.

In certain embodiments, the signage display management module 134 of the signage device controller 122 can also accept user instructions embedded in HTTP requests over the web server 131 of the signage device controller 122 for performing control functions (managing the managed signage devices), translate the user instructions to corresponding RS-232 standard control commands, and send these RS-232 standard control commands to the managed signage devices 140-I (I=1, 2, . . . , N) to instruct these managed signage devices to perform these RS-232 standard control functions.

In certain embodiments, the digital signage management module 134 of the signage device controller 122 performs following managed signage device control functions. These control functions are reflected in a set of RS-232 standard control commands. The set of RS-232 standard control commands includes:

(a) Tier 1 commands—High Utility:
Power management: powering the managed signage devices on or off, power cycle, restart, either collectively or individually;
Input resource management: selecting from various Video inputs, RGB inputs and HDTV inputs;
Screen size management: adjusting screen size, and aspect ration;
Video quality management: adjusting brightness, contrast, color saturation, tint, sharpness etc;
Audio quality management: adjusting audio volume (if available) and Mute;
Query management: single query, bulk query, system reset and pinging;
(b) Tier 2 commands—Moderate Utility:
Audio quality management: adjusting audio treble, bass, sound balance;
Picture or Video display location: adjusting horizontal size and position, vertical size and position (if available) and Mute;
Refreshing rate management: adjusting clock phase;
Color management: adjusting color, color temperature, Red/Green/Blue biases, Red/Green/Blue gains, and gamma;
(c) Tier 3 commands—Low Utility:
Tiling management: managing the width/height of tiled wall in number of screens, the horizontal or vertical locations of this screen in tiled wall;
Language management: selecting a display language from English, French, German, Spanish, Italian, Japanese, Chinese etc;
Miscellaneous management: managing picture in picture, orbiting, power save, on screen menu.

In one embodiment, the range used for parameter values such as brightness or volume is from 0 to 100. All numbers are in hexadecimal unless indicated otherwise. Percentages are shown in decimal. The RS-232 command set in setup in following general command form:

(a) STX: the first character is the standard Start of Text (STX) character 02;
(b) Address: the second and third characters are the managed signage device addresses, ranging from 00 00 through FF FF. If a device does not support addressing, these should be 00 and 00 to act as the global address;
(c) Type: the fourth character is one of four command types:
 a. Command 01,
 b. Ack 02,
 c. Nak 03, and
 d. Notification 04;
(d) Property ID: the fifth and sixth characters are the property ID, ranging from 00 00 through FF FF;
(e) Data Length: the seventh character is the number of characters in the parameter data section;
(f) Data: following the seventh character is the parameter data section that is as many characters long as the seventh character indicates. If the seventh character is 00 (as with the Reset command for example) then there are no characters in the parameter section. This parameter section contains the value for the property; and
(g) ETX: the last character is a standard End of Text (ETX) character 03.

In certain embodiments, the web server 131 is designed to receive operator's operation requests sent by a web browser on the remote management device over a network, instead of going through the IPMI messaging channel. When the operator wants to make certain adjustments to the managed signage devices, the operator can input instructions through the management webpages displayed on the web browser. Once receiving the user instructions, which include control functions and associated parameters, the Web server sends the control functions and parameters to the signage display management module 134. The signage display management module 134 accordingly translate the control functions and parameters to appropriate RS-232 Control Standard commands or other proprietary standard commands, and then send those commands to the managed signage devices.

Figure 2:
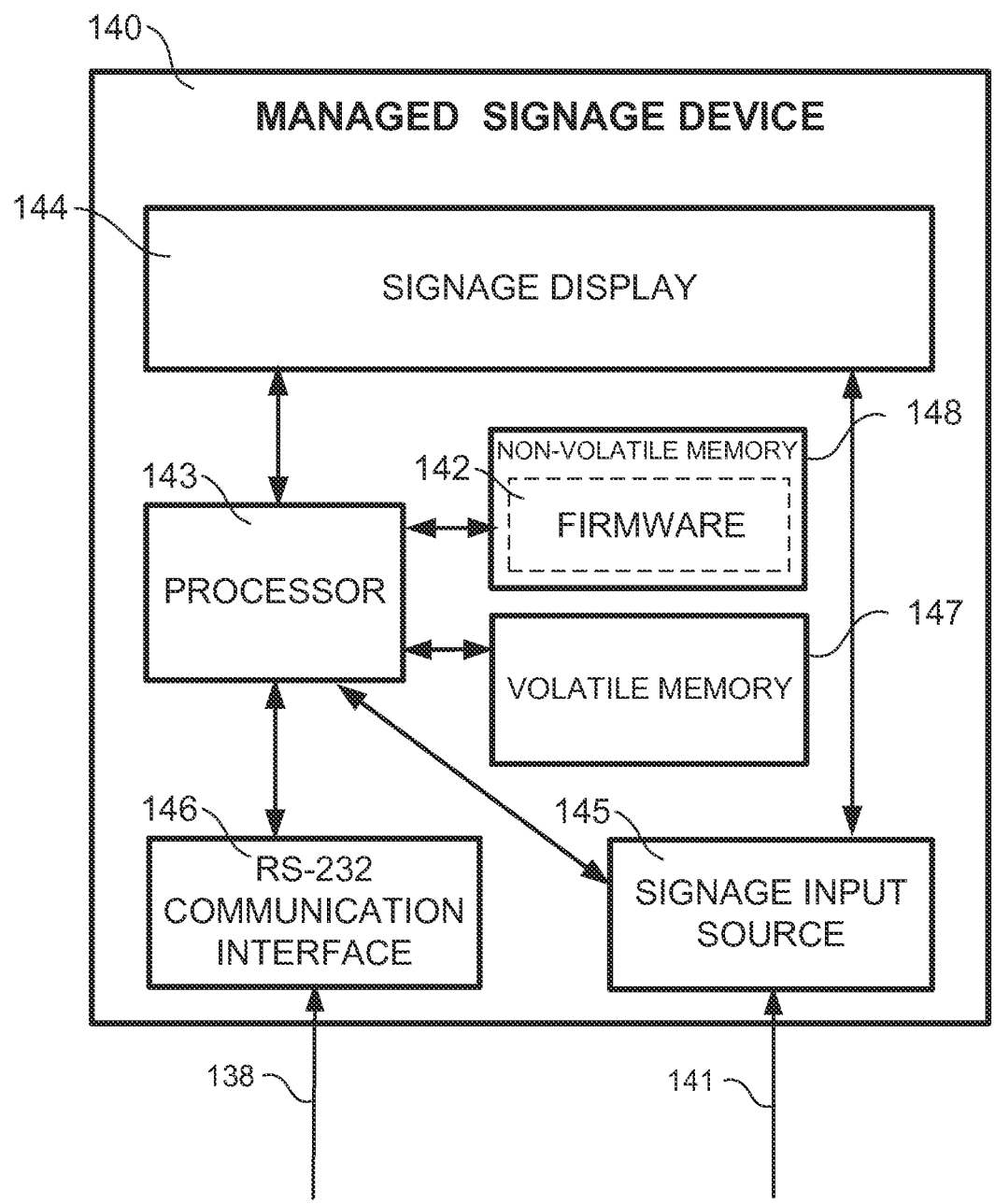
FIG. 2 schematically shows a managed signage device according to one embodiment of the present disclosure.

In certain embodiments, the signage device controller 122 can manage signage devices 140-I, I=1, 2, . . . , N in a daisy chain configuration. As shown in FIG. 2, each of the managed signage devices 140 may include: a signage display screen 144, a processor 143, a volatile memory 147, a non-volatile memory 148 storing firmware 142, one or more input sources 145, and a RS-232 communication interface 146 connected to the RS-232 communication link 138.

The managed signage device 140 can be any suitable type of signage device with a RS-232 communication interface. The RS-232 communication interface 146 is in communication with the RS-232 communication control point 139 of the signage device controller 122. The RS-232 communication interface 146 receives the control commands from the signage display management module 134 of the signage device controller 122 over the RS-232 communication link 138. The signage display input 145 receives media files or signals from an input channel 141. In certain embodiments, the input channel 141 is in communication with a media content provider through an in-band communication network.

The managed signage device 140 receives control and management commands over the RS-232 communication link 138, and executes the control and management commands. The control and management commands may include one or more of: (a) reporting the device information to a requester, (b) selecting an input source, (c) making audio adjustment, and (d) making display adjustment.

Figure 3:
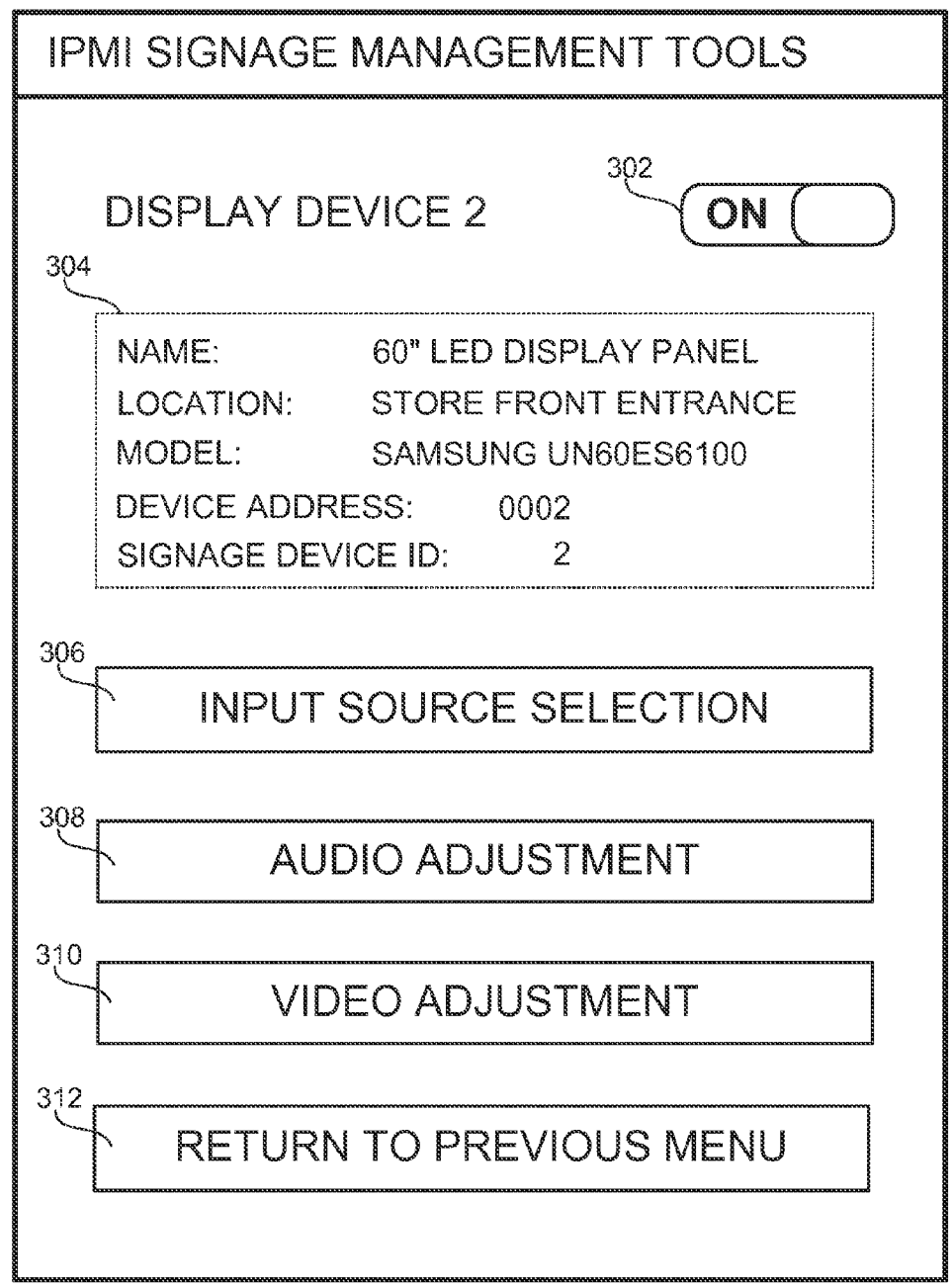
FIG. 3 shows an exemplary selected managed signage device user interface screen of a remote management device according to one embodiment of the present disclosure.

FIG. 3 shows an exemplary selected managed signage device user interface screen of a mobile remote management device according to one embodiment of the present disclosure. When the operator selects a signage device DISPLAY DEVICE 2 from a "Select Signage Display Device" user interface screen, the user interface display the exemplary user interface screen 300 shown in FIG. 3. The user interface screen 300 includes: (a) a status and on/off switch option 302, (b) a brief information display about the selected signage device 304, (c) an "Input Source Selection" option 306, (d) an "audio adjustment" option 308, (e) a "display adjustment" option 310, and (f) a "Return to Previous Manu" option 316.

In this example, the status and on/off switch button 302 serves two purposes. One is to indicate the current on/off status of the "Display Device 2". The other is to allow the operator to power on this "Display Device 2" by sliding the button 302 on the left to the right and turn off this "Display Device 2" by sliding the button 302 on the right to the left. The property information display area 304 displays: (a) the name of the "Display Device 2": 60" LED display Panel, (b) the location: Store Front Entrance, (c) the Model number: Samsung UN60ES6100, (d) device address: 0002, and (e) the signage device ID: 2.

The input source selection option 306 allows the operator to select the input sources available for display at the "Display Device 2". The input sources may include: (a) one or more HDMI inputs, (b) a DVI Digital inputs from one or more PCs, and (c) RGB composite video inputs. Other input sources may include (a) a coaxial TV input cable, (b) RCA video input, (c) IPTV video inputs, and (d) USB input from a media carrier such as a flash drive.

The audio adjustment option 308 allows the operator to make audio adjustment to the "Display Device 2". The options (not shown in any of the drawings) may include one or more of: (a) a volume adjustment option, (b) a balance adjustment option, (c) bass and treble adjustment option, and (d) a mute option.

The display adjustment option 310 allows the operator to make display adjustment to the "Display Device 2". Detailed information is presented in the description of display adjustment option as shown in FIG. 4.

The option 316 allows the operator to navigate back to the previous menu.

Figure 4:
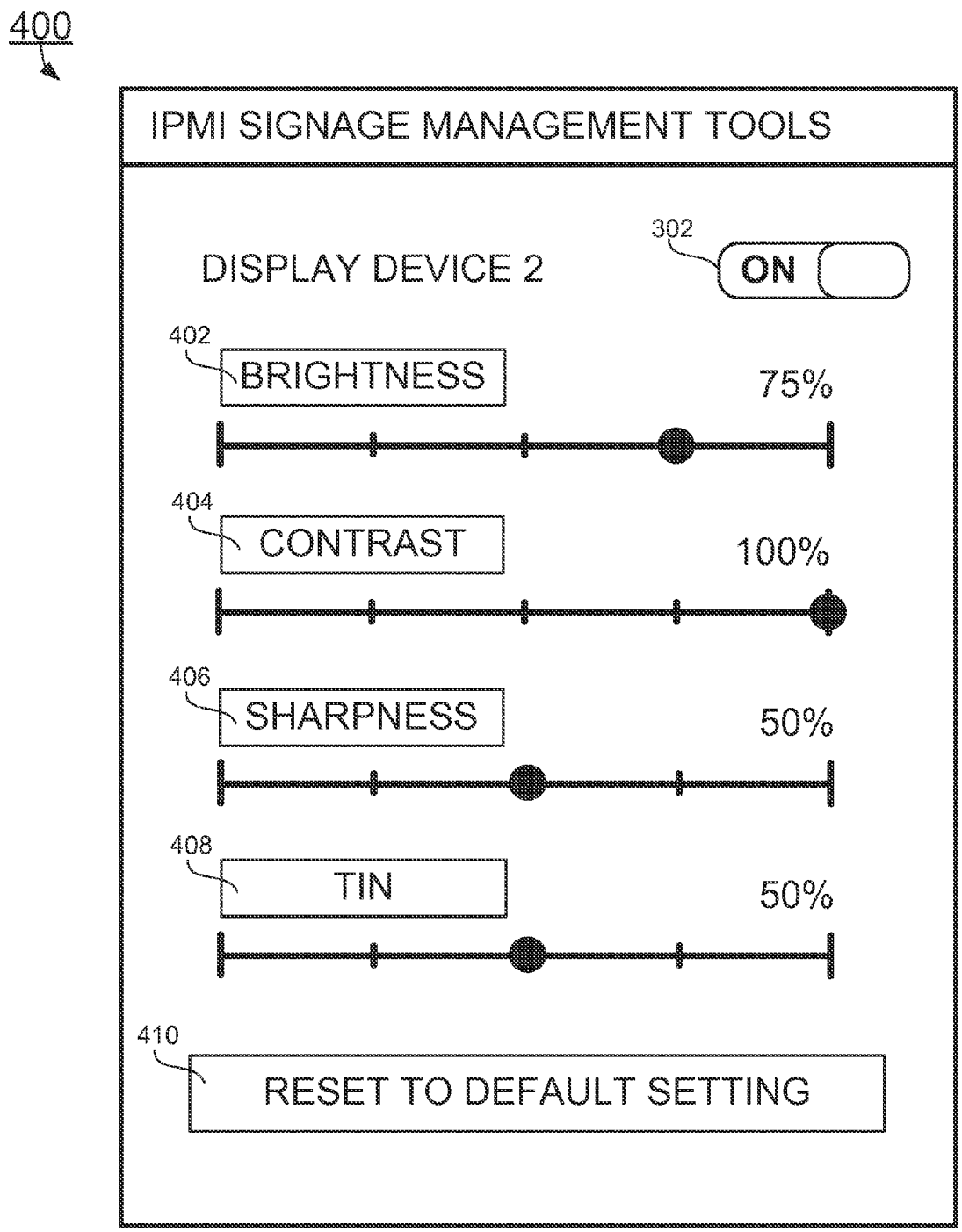
FIG. 4 shows an exemplary display adjustment user interface screen of a remote management device according to one embodiment of the present disclosure.

When the operator selects the display adjustment option 310, the user interface module of the remote management device 101 displays an exemplary display adjustment user interface 400 as shown in FIG. 4 according to one embodiment of the present disclosure. The display adjustment user interface 400 includes: (a) the name of the device and a status-on/off switch symbol 302 similar to the one in FIG. 3, (b) a brightness adjustment bar 402, (c) a contrast adjustment bar 404, (d) a sharpness adjustment bar 406, (e) a tin adjustment bar 408, and (f) a reset to default setting option 410.

The dot at each of the brightness adjustment bar 402, the contrast adjustment bar 404, the sharpness adjustment bar 406, and the tin adjustment bar 408 indicates the current settings. In this example, brightness is set to 75%, contrast is set to 100%, saturation and hue are both set to 50%. The dot can also be used by user to adjust the corresponding settings. If the user would like to change the setting, a finger tap on the dot and move to the left to decrease or to the right to increase the respective settings until a desired setting is reached.

The foregoing description of a few simple examples of the user interface of the signage device management applications on the remote management device 101 and 102 has been presented only for the purposes of illustration and description and is not intended to be exhaustive or to limit the disclosure to the precise forms disclosed. Many modifications and variations are possible in light of the above teaching.

FIG. 5 illustrates some control messages (commands) that can be constructed by the signage device controller 122. An exemplary managed signage device management command is shown in FIG. 5A. In this example, the Address characters are both 00, which is the global address for all devices connected to the RS-232 communication link 138. The Type character is 01 to indicate the transmission is a command. The property ID characters indicate a property identifier of 01, which in this protocol is the value for power. The Length character is a 1, which indicates that there is one character of data associated with this command. The Data has a value of 1, which is the value for ON. The last character is the ETX 03. Therefore, the managed signage device management command represents a managed signage device management command: Power On all managed signage devices 140-I (I=1, 2, . . . , N) connected to the RS-232 communication link 138. For such management operation, there is no acknowledgement from the managed signage devices.

If the user wants to query the status of the plurality of managed signage devices, he/she can send a RS-232 command as shown in FIG. 5B to obtain the status of all managed signage devices. In this example, the Address characters are both 00, which is the global address for all devices connected to the RS-232 communication link 138. The Type character is 01 to indicate the transmission is a command. The property ID characters indicate a property identifier of FE 00, which in this protocol is to query. The Length character is a 2, the Data has a value of "00 01", which is to query the power status. The last character is the ETX 03. The signage display management module 134 transmits the above RS-232 query commands to the all managed signage devices through the RS-232 communication control point 139.

At the signage devices, the firmware 142-I, I=1, 2, . . . , N receive the RS-232 query command through the RS-232 communication interfaces 146-I, I=1, 2, . . . , N, respectively, and then each of the managed signage devices checks the power status and sends a notification to the signage display management module 134 through their corresponding RS-232 communication interfaces 146-I, and the RS-232 communication link 138, individually.

The signage display management module 134 will collect and then attach the notification in data portion of an IPMI message individually, and embed these IPMI messages separately in a TCP/IP packet, and send to the remote management device 101 for processing as soon as the individual IPMI message is received. The remote management device 101 will determine the power status of all managed signage devices 140-I, I=1, 2, . . . , N, and display to the user.

Another exemplary managed signage device management command is shown in FIG. 5C. In this example, the Address characters are "00 02", which is the address for the second managed signage device 140-2 connected to the RS-232 communication link 138 (the "Display Device 2" in our earlier example). The Type character is 01 to indicate the transmission is a command. The property ID characters indicate a property identifier of 02, which in this protocol is the value for input source. The Length character is a 1, which indicates that there is one character of data associated with this command. The Data has a value of 23, which is the value for connecting to the third HDTV source HDTV3. The last character is the ETX 03. Therefore, the managed signage device management command represents a managed signage device management command: connecting the second managed signage device 140-2 to the input source of HDTV3. For such management operation, there is no acknowledgement from the managed signage device.

If the user wants to query the input source of the second managed signage device 140-2, he/she can send a RS-232 command as shown in FIG. 5D to obtain the input source of the second managed signage device 140-2. In this example, the Address characters are "00 02", which is the address for the second managed signage device 140-2 connected to the RS-232 communication link 138. The Type character is 01 to indicate the transmission is a command. The property ID characters indicate a property identifier of FE 00, which in this protocol is to query. The Length character is a 2, the Data has a value of "00 02", which is to query the input source. The last character is the ETX 03. The signage display management module 134 transmits the RS-232 query command to the second managed signage device 140-2 through the RS-232 communication control point 139 and the daisy chain.

At the second managed signage device, The firmware 142-2 receive the RS-232 query command through the RS-232 communication interface 146-2, and then the second managed signage device 140-2 checks the input source and sends a notification back to the signage display management module 134 through their corresponding RS-232 communication interfaces 146-I, and the RS-232 communication link 138, individually. The signage display management module 134 will then attach the notification in data portion of an IPMI message, and embed the IPMI message in a TCP/IP packet, and send to the remote management device 101 for processing. The remote management device 101 will determine the input source of the second managed signage device 140-2 and display to the user.

Figure 6:
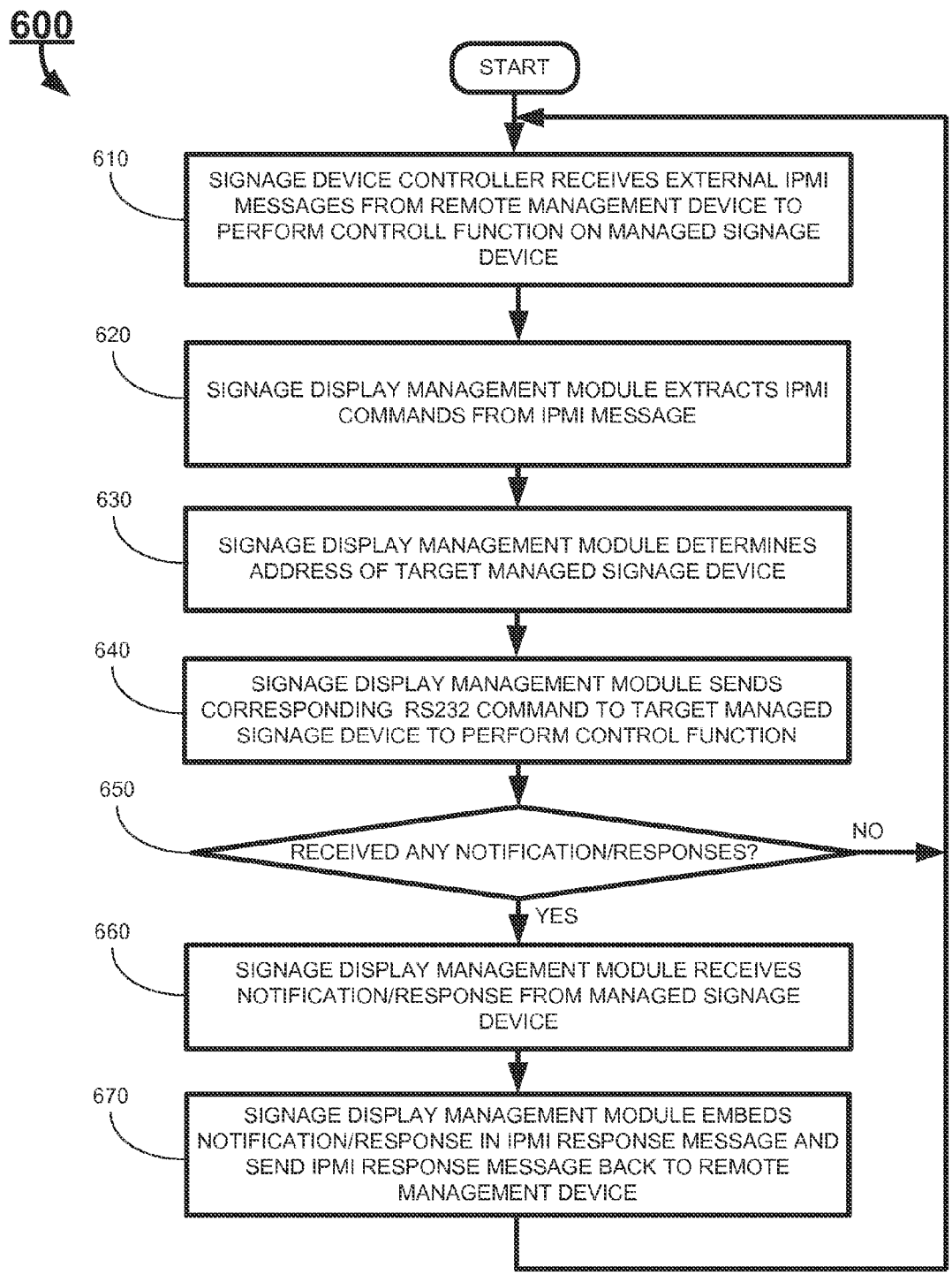
FIG. 6 shows an exemplary flow chart of a control process performed by a remote management system according to one embodiment of the present disclosure.

FIG. 6 shows a flow chart 600 of exemplary operations of a remote digital signage display management system 100 according to certain embodiments of the present disclosure. At STEP 610: the signage display management module 134 of the signage device controller 122 receives an IPMI message 109 from a remote management device 101, to perform a control function on one or more managed signage devices.

At STEP 620, the signage display management module 134 extracts an OEM command embedded in the IPMI message containing a management request to perform one control function on the signage device designated by a device ID. For example, OEM command may request to turn on all managed signage devices.

At STEP 630, the signage display management module 134 determines the address of the target signage devices based on the parameter value device ID.

At STEP 640, the signage display management module 134 constructs one or more commands according to the RS-232 Control Standard or other control standard based on the OEM command and send to the target signage devices through respective communication control point 134. The command includes an address of the target signage devices. In this case the address of the managed signage devices is "00" as shown in FIG. 5A for all managed signage devices 140-I, I=1, 2, . . . , N. For example, the communication between the RS-232 communication control point 139 and the target managed signage devices is in accordance with the RS-232 communication protocol. If other control standards are used, then the RS-232 communication control point 139 will be changed to a communication control point in accordance with the other control standards, and the specific control commands according to the control standards will be sent out to the target signage devices. When the managed signage devices 140-I receive the commands through their respective RS-232 communication interfaces 146-I, the firmware 142-I of each of the managed signage devices 140-I executes the management command and perform the control functions requested.

At STEP 650, the signage display management module 134 checks if the RS-232 communication control point 134 receives any notification or responses from the managed signage devices. Some of the control functions are one directional commands (e.g., turning managed signage devices on/off, changing volume, or muting audio, etc.) that do not require any responses. Other commands such as query, bulk query require the managed signage devices may prompt the signage devices to provide a response, feedback, or notifications. Therefore, the RS-232 communication control point 134 may receive notifications in response to the control function performed. For RS-232 commands addressed to individual managed signage device, the signage display management module 134 may receive individual responses. For RS-232 commands addressed to all managed signage devices, the signage display management module 134 may receive separate response individually from each of the managed signage devices the commands addressed to. If the signage display management module 134 receives one or more responses/notifications, the signage display management module 134 continues to the next step to process the responses/notifications. If the signage display management module 134 does not receive any response/notification, the signage display management module 134 return to the start to wait for next IPMI request for performing another control function.

At STEP 660: the received responses/notifications are passed from the RS-232 communication control point 134 to the signage display management module 134.

At STEP 670: the signage device controller 122 then sends the response received from the signage devices through an IPMI response message to the remote management device 101.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A signage device management system, comprising:
   at least one managed signage device, each comprising:
   a communication interface; and
   an input channel independent and separate from the communication interface, the input channel being in communication with a signage content provider through a first communication network to solely receive signage display contents from the media content provider over the first communication network;
   a remote management system; and
   a signage device controller comprising:
   a processor;
   a network interface controller communicatively connected to the remote management system through a second network, wherein the second network is independent and separate from the first communication network;
   a communication control point in communication with the communication interface of each of the at least one managed signage device through a communication link in accordance with a control protocol; and
   a memory containing firmware;
   wherein the firmware of the signage device controller is configured to, when executed at the processor, be in communication with the at least one managed signage device through the communication control point; and provide a communication access for the remote management system to communicate with the at least one managed signage device by:

receiving, through the network interface controller, a management request in accordance with a communication protocol from the remote management system through the second network, wherein the management request instructs the firmware to perform a management operation at the at least one managed signage device; and constructing a control command in accordance with the control protocol and sending the control command to the at least one signage device through the communication control point, wherein the control command instructs the at least one managed signage device to perform the management operation.

2. The signage device management system of claim 1, wherein the firmware is further configured to receive a response from the at least one managed signage device;

construct an IPMI response message carrying the response from the at least one managed signage device; and send the IPMI response message back to the remote management system.

3. The signage device management system of claim 1, wherein the remote management system comprises:

a remote management device; and a mobile remote management device;

wherein each of the remote management device and the mobile remote management device has a web browser, an operating system, and an application program having at least a user interface module, and a client management module in accordance with the communication protocol.

4. The signage device management system of claim 1, wherein the signage device controller is a service processor that provides the communication access for the remote management system to communicate with the at least one managed signage device, and the signage display contents are transmitted from the signage content provider to the at least one managed signage device over the first communication network.

5. The signage device management system of claim 1, wherein the firmware further comprises:

a signage display management module configured to manage and perform control functions on the at least one managed signage device according to RS-232 protocol;

an IPMI message module configured to process the incoming IPMI message from and outgoing IPMI message to a remote management device;

a RS-232 communication control point for receiving and transmitting RS-232 protocol communication through a RS-232 communication link;

a system event log (SEL) for storing signage display events and system events of the remote management system of signage display;

a sensor data record (SDR) repository configured to store inventory of the at least one managed signage device connected through the RS-232 communication link; and a network interface module configured to receive IPMI messages from the remote management device and to transmit IPMI response messages to the remote management computer.

6. The signage device management system of claim 5, wherein each of the management requests received by the signage display management module includes management commands in accordance with the communication protocol, the signage display management module constructs a control protocol command based on the management requests, and the control protocol being capable of directing communication among the at least one managed signage device.

7. The signage device management system of claim 6, wherein the communication protocol is IPMI protocol.

8. The signage device management system of claim 7, wherein the IPMI message module is configured to extract an OEM command from an IPMI message received through the network interface controller, and wherein the signage display management module is configured to translate the OEM command to a corresponding RS-232 control command.

9. The signage device management system of claim 7, wherein each of the management requests is an IPMI message, the IPMI message including at least an IPMI standard command or an IPMI OEM command, a signage device ID of a selected managed signage device, and an related command value.

10. The signage device management system of claim 1, wherein the communication protocol is HTTP protocol.

11. The signage device management system of claim 10, wherein the management request is an HTTP request, the HTTP request including at least an control command, a signage device ID of a selected managed signage device, and a related command value.

12. The signage device management system of claim 1, wherein the communication control point is an RS-232 communication control point, the control protocol is RS-232 communication protocol, and wherein the signage display management module is configured to retrieve an IPMI OEM command from the IPMI message, the IPMI OEM command containing a control function, and the signage device ID of the managed signage device the control function is directed to;

translate the IPMI OEM command into a corresponding RS-232 command; and transfer the RS-232 command to the managed signage device designated by the signage device ID, where the managed signage device performs the control function according to the RS-232 command received.

13. The signage device management system of claim 12, wherein the firmware is configured to determine a managed signage device from the at least one managed signage device based on inventory information stored in a SDR repository, and wherein the inventory information is obtained during the initial installation of managed signage devices.

14. The signage device management system of claim 1, wherein the firmware is configured to associate addresses of the at least one managed signage device and in accordance with the RS-232 communication protocol with respective signage device IDs, maintain a record of the association of the signage device IDs and addresses, and determine an address of a target signage device by examining the record with a device ID of the target signage device.

15. The signage device management system of claim 1, wherein the control protocol is in accordance with Digital Signage Device RS-232 control standard.

16. A signage device controller implemented method for managing at least one signage device, comprising:

performing, at the signage device controller, a communication to the at least one managed signage device, such that the signage device controller is, via a communication control point, in communication with a communication interface of each of the at least one managed signage device through a communication link in accordance with a control protocol, wherein each of the at least one managed signage device comprises the communication interface and an input channel independent and separate from the communication interface, the input channel being in communication with a signage content provider through a first communication network to solely receive signage display contents from the media content provider over the first communication network; and providing, by the signage device controller,-a communication access for the remote management system to communicate with the at least one managed signage device by:

receiving, at the signage device controller, a management request from a remote management system in accordance with a communication protocol at a network interface controller through a second network, wherein the management request has at least a management command and an device ID of the at least one managed signage device, and the second network is independent and separate from the first communication network;

extracting the management command and the device ID of the at least one managed signage device;

translating the management command to a control command in accordance with the control protocol;

sending the control command over the communication link to the at least one managed signage device designated by the device ID;

receiving a response from the at least one managed signage device;

constructing an IPMI response message carrying the response from the at least one managed signage device; and sending the IPMI response message back to the remote management system.

17. The signage device controller implemented method of claim 16, wherein the communication protocol is IPMI protocol.

18. The signage device controller implemented method of claim 17, wherein the management request is an IPMI message, the IPMI message including at least an IPMI standard command or an IPMI OEM command, a signage device ID of a selected managed signage device, and a related command value.

19. The signage device controller implemented method of claim 16, wherein the communication protocol is HTTP protocol.

20. The signage device controller implemented method of claim 19, wherein the management request is an HTTP request, the HTTP request including at least a control command, a signage device ID of a selected managed signage device, and a related command value.

21. The signage device controller implemented method of claim 16, wherein the control protocol is in accordance with Digital Signage Device RS-232 control standard.

22. The signage device controller implemented method of claim 16, wherein the remote management system comprises:

a remote management device, wherein the remote management device has a web browser, wherein the signage device controller has a web server that delivers a management webpage to the web browser, and wherein the management webpage is configured to instruct the web browser to send the management request to the web server.

23. The signage device controller implemented method of claim 16, wherein the signage device controller is a service processor that provides the communication access for the remote management system to communicate with the at least one managed signage device, and wherein the signage display contents are transmitted from the signage content provider to the at least one managed signage device over the first communication network.

24. A non-transitory computer storage medium having computer executable instructions stored thereon which, when executed by a processor of a signage device controller, cause the processor to:

perform a communication to the at least one managed signage device, such that the signage device controller is, via a communication control point, in communication with a communication interface of each of the at least one managed signage device through a communication link in accordance with a control protocol, wherein each of the at least one managed signage device comprises the communication interface and an input channel independent and separate from the communication interface, the input channel being in communication with a signage content provider through a first communication network to solely receive signage display contents from the media content provider over the first communication network; and provide a communication access for the remote management system to communicate with the at least one managed signage device by:

receiving a management request from a remote management system in accordance with a communication protocol through a network interface controller through a second network, wherein the management request has at least a management command and a device ID of at least one managed signage device, and the second network is independent and separate from the first communication network;

extracting the management command and the device ID of the at least one managed signage device from the management request;

translating the management command into a control command in accordance with the control protocol;

sending the control command over the communication link to the at least one managed signage device designated by the device ID;

receiving a response from the at least one managed signage device;

constructing an IPMI response message carrying the response from the at least one managed signage device; and sending the IPMI response message back to the remote management system.

25. The non-transitory computer storage medium of claim 24, wherein the signage device controller is a service processor that provides the communication access for the remote management system to communicate with the at least one managed signage device, wherein the signage display contents are transmitted from the signage content provider to the at least one managed signage device over the first communication network.

\* \* \* \* \*